(12) United States Patent
Fattouch (10) Patent No.: US 7,127,212 B2
(45) Date of Patent: Oct. 24, 2006

(54) METHOD AND APPARATUS FOR PLANNING FREQUENCIES

(75) Inventor: Imad Fattouch, Paris (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 482 days.

(21) Appl. No.: 10/215,180

(22) Filed: Aug. 9, 2002

(65) Prior Publication Data

US 2003/0078051 A1    Apr. 24, 2003

(30) Foreign Application Priority Data

Aug. 10, 2001    (FR) .................................. 01 10717

(51) Int. Cl.
*H04B 1/00* (2006.01)
*H04B 17/00* (2006.01)
*H04Q 7/20* (2006.01)

(52) U.S. Cl. .................. 455/63.1; 455/67.11; 455/450; 455/451; 455/452.1; 455/452.2

(58) Field of Classification Search ................ 455/450, 455/451, 452.1, 452.2, 446, 63.1, 67.11
See application file for complete search history.

(56) References Cited

U.S. PATENT DOCUMENTS

| 5,551,064 | A  |   | 8/1996  | Nobbe et al. |
| 6,111,857 | A  |   | 8/2000  | Soliman et al. |
| 6,456,848 | B1 | * | 9/2002  | Freeman et al. ............ 455/450 |
| 6,466,793 | B1 | * | 10/2002 | Wallstedt et al. ........... 455/450 |
| 6,591,109 | B1 | * | 7/2003  | Pan .......................... 455/452.1 |
| 6,611,506 | B1 | * | 8/2003  | Huang et al. ................ 370/329 |
| 6,658,257 | B1 | * | 12/2003 | Hirayama et al. .......... 455/451 |
| 6,694,141 | B1 | * | 2/2004  | Pulkkinen et al. .......... 455/454 |
| 6,728,544 | B1 | * | 4/2004  | Boyer et al. ................ 455/450 |

FOREIGN PATENT DOCUMENTS

| EP | 0 490 554 A2 | 6/1992 |
| EP | 0 847 213 A2 | 6/1998 |
| WO | WO 94/03986 | 2/1994 |

* cited by examiner

*Primary Examiner*—Lester G. Kincaid
*Assistant Examiner*—Un C. Cho
(74) *Attorney, Agent, or Firm*—Lowe, Hauptman & Berner, LLP (57) ABSTRACT

Frequencies are allocated to plural base stations for managing cells of a cellular wireless telephone network by a computer which for a given cell, allocates a frequency associated with an estimated minimal interference, and selects another cell of remaining cells to be processed. The computer (1) develops a chain of downstream cells within mutual radio range by repeating the above steps for each cell, (2) compares estimated interference levels with a threshold, (3) defines a remainder of cells by eliminating from the remaining set of plural cells to be processed, cells associated with an interference level less than the threshold, (4) develops a first segment of a chain of cells of allocated frequencies when the remaining cells have been defined, and (5) develops a second chain segment by allocating frequencies to the unprocessed remaining cells by searching for other frequencies to be allocated to the remaining cells by iterating these steps until no cells remain.

16 Claims, 4 Drawing Sheets

|   | Ki<br>25 % | Li<br>10 % | Mi<br>18 % |
|---|---|---|---|
|   |   | Xi | Yi |
|   |   |   | Zi |
|   |   |   |   |

|   | Kj<br>23 % | Lj<br>18 % | Mj<br>16 % |
|---|---|---|---|
|   |   | Xj | Yj |
|   |   |   | Zj |
|   |   |   |   |

*Overlap Zone of Two Same-Site Cells*

Fig. 5

*Overlap Zones of Two Cells on Different Sites*

*Frequencies Schedule Checkout*

METHOD AND APPARATUS FOR PLANNING FREQUENCIES

FIELD OF INVENTION

The present invention relates to cellular wireless telephone networks and in particular the planning, hereafter scheduling, of the network frequencies.

BACKGROUND ART

A wireless cell network, for instance the GSM network, includes a plurality of ground radio base stations which are connected to each other through the wired telephone network and which can be accessed by mobile terminals when the mobile terminals are situated within the radio cell of one station.

Each base station must have a sufficient range to assure that it overlaps into the neighboring cells in order to avoid any danger of the communication being cut when a mobile terminal changes cells. As a result the stations' transmitted powers must be larger than the required rigorous minimum.

Accordingly a mobile wireless terminal might receive at effective signal strength the transmissions from two stations when it is situated within an overlap zone of two cells. In practice the mobile wireless terminal receives many more signals and, if energized, links up with the nearest station, in the sense of radio transmission, namely the one which applies to it the highest radio electric field strength from the six optimal cells. As regards the overlap zone, the transmission from a station which is rejected by the terminal therefore constitutes an interference signal of the same order of magnitude as the useful signal from the hook-up cell. Moreover, because the station signals consist of time frames of the same structure, the terminal is unable to implement a specific spectrum filtration to attenuate the interfering signal(s).

In order to set up the wireless network, the operator can control a range of frequencies allocated to him and constituting a precious resource. The operator regularly distributes carrier frequencies, or transmission channels within the range. A frequency gap separating two carrier frequencies is large enough that inter-channel interference—in the light of the receiver selectivities—remains below a specific threshold of good operation.

However the number of available carrier frequencies is much lower than the number of channels required for the total network. Consequently the same frequency must be exploited in the network. However, each time the same frequency is used care must be taken that in each server cell the signal strength of the interfering signals at the frequency of its carrier(s) and incident from the stations of the other neighboring cells must remain below a sound operating threshold. In other words, at any point in the cell, there must be a safety margin between the received useful signal and the field strength of the interfering signal(s) at that frequency. However, calculating what these interferences are in a network including several thousand stations that interfere with one another requires a long computing times using an average power conventional calculator.

Considering only one cell in a conventional calculation, an estimate based on an algorithm is used for the various frequencies for their mutual interferences with the other cells within radio range, and the frequency corresponding to least interference is then selected. Next the algorithm considers a near cell and repeats those steps. In this manner, the frequencies are allocated stepwise throughout the network.

In this manner the various interferences received at the various frequencies constitute a matrix of the constraints relating to each cell and indicating the rejection weights of the various frequencies.

Accordingly this is an algorithm systematically selects the optimal local gradient within each cell of an interference function. The "output" variable of the matrix is a frequency having a value dependent on the "input" variable which is the interference.

When stated in conceptual form, a gravity-determined line of largest slope moves in a trough.

However this algorithm fails to be optimal: Even if—when selecting the cell frequencies—the interferences it generates are taken into account. Conventionally the initial selections by hypothesis in turn determines the selection of the downstream cells left unquestioned. This logic is set once and forever.

To return to the above previously mentioned concept, it is impossible to rise along the slopes of tile valley to check if an adjacent valley would serve better.

In other words, the algorithm is unidirectional whereas the interference constraints are "mutual," that is bi-directional. The algorithm therefore poorly fits the problem and moreover its convergence time for scheduling frequencies is long because the mutual constraints entail a large number of radio stations which are in mutual radio range. The computational load substantially varies exponentially with the number of stations (the so-called full-NP problem).

An objective of the present invention is to at least reduce, all other things being equal, the convergence time of the algorithm.

SUMMARY OF THE INVENTION

For that purpose, the invention relates to a method of scheduling a given number of frequencies which are to be allocated to a plurality of base stations for managing the cells of a cellular wireless telephone network. An algorithm of the method is performed by a calculating system accessing a given number of radio-communication carrier frequencies. Before the algortihm is performed, the system user selects an interference threshold between two arbitrary cell. Then the algorithm:

(a) selects a predetermined upstream cell,
(b) estimates, within the cell being considered, interfering signal strengths at the various frequencies imparted by other cells within radio range,
(c) allocates to the cell under consideration a frequency associated with minimal interference, and
(d) selects another cell from the remaining plurality of cells to be processed, to progressively develop a chain of downstream cells which are in mutual radio range by repeating the above steps for each of them, a calculating system compares the estimated interference levels with the threshold, and defines a remaining set of cells by eliminating from the remaining set of cells to be processed those cells which are associated with an interfering signal strength lower than the threshold.

Once the remaining set of cells has been defined, the algorithm, by developing in this manner a first segment of allocated-frequency cells, develops a second segment of the chain by allocating frequencies to the unprocessed cells of the remaining set of cells by searching other frequencies to be allocated to these cells of the remaining set by iterating the selecting and comparing steps until the remaining set is an empty set.

The algorithm develops the first segment by a series of truncated cycles and considers only, for each cell to be processed, a limited number of interfering cells that remain to be treated. The algorithm performs the second segment by a series of comprehensive testing cycles that, with respect to each cell to be processed, take into account the interfering cells which remain to be processed.

In this manner the cells that are subjected to the frequency allocation steps as classified into two consecutively processed sub-groups.

Preferably the user or the algorithm retrieves from the first segment some of the cells in order to ascertain whether integrating them into the second segment would form a cell chain of lower interference.

In this manner the algorithm does not converge along a monotonic slope of local optimization as discussed above but, instead, takes into account the "far" environment to check whether another line of steeper slope may be considered at the cost of an ascent by reintroducing a strong interference. In particular, blocking is averted in this manner when a line of maximum slope hits a "wall."

Another objective of the present invention is to propose apparatus for performing the method of the invention.

This goal is attained by the apparatus for determining optimal scheduling for allocating a given number of frequencies to a plurality of base stations for managing the cells of a cellular wireless telephone network. The apparatus comprises a calculating system which
- contains a stored list of a given number of wireless communication carrier-frequencies,
- comprises devices for selecting an upstream cell that was determined beforehand within a geographic zone defined in a map stored in the calculating system,
- includes a program of interference calculations for estimating within the cell under consideration the interference signal strength at various frequencies that is due to other cells within radio range,
- allocates to the cell under consideration a frequency associated with minimal interference and stores this frequency in a file of the processed cells,
- selects another cell from the remainder of the plurality of cells to be processed, to progressively develops a chain of downstream cells in mutual radio range by repeating for each of them the two above steps,
- said apparatus being characterized in that it comprises The apparatus includes:
- interactive devices for allowing the system user to predetermine a mutual interference threshold between two arbitrary cells,
- devices for allowing the system to compare the estimated signal strengths with the threshold,
- devices to define a remaining cell by eliminating from the remaining plurality of cells to be processed those cells which are associated with a signal-strength level which is less than the threshold. When the remaining cells developed in this mariner indicate a first segment of the cell chain of allocated frequencies, then the calculating system develop a second chain segment by allocating frequencies to the unprocessed cells of the remainder by seeking other frequencies to be allocated to these cells of the remainder by iteration until the remainder is an empty set. The apparatus also includes devices making it possible for the calculating system to develop the first segment by a series of truncated cycles which only take into account with respect to each cell to be processed a limited number of the interfering cells which remain to be processed and which exceed the threshold, and to develop the second segment by using a series of comprehensive checks that take into account, for each cell to be processed, all of the interfering cells which remain to be processed.

In another feature of the apparatus of the invention, devices are used whereby the user or the algorithm can retrieve from the first segment, which constitutes a taboo list, some of the cells to check whether their integration into the second segment would lead to a cell chain of reduced interference, thereby improving the frequency allocation schedule.

In another feature of the apparatus of the invention, devices storing and taking into account certain files are included as follows:
- *.CON, which contains the constraints matrix to be taken into account, resulting from a calculating module CONSTRAINTS,
- *.LID which contains the list of cells involved in the frequencies schedule as well as their characteristics, e.g., capacity, type of sharing,. etc.
- *.PHB which contains of cells which are prohibited by the planner from using certain channels and the list of prohibited channels for each of said cells,
- *.NBR which contains the list of neighboring cells and must rigorously correspond to the *.LID file,
- *.MRP which contains the description of the frequency-band shape.

In another feature of the apparatus of the invention:
- the user ad Lusts the service zone by resorting to interactive graphic devices of the calculating system,
- the calculating system recalculates interference predictions for each frequency of each cell,
- the user pre-allocates channels by resort to interactive devices of the calculating system,
- the frequencies allocation schedule is recalculated.

Lastly, in another feature of the apparatus of the invention, devices are included that allow:
(1) selecting the menu to enable parameters to be selected and then calculating the frequencies schedule,
(2) selecting parameters of a dialog box in a manner that the least garbled frequency has priority for allocation to the BCCH channel,
(3) taking into account the channels that were pre-allocated when the service zone was created,
(4) selecting parameters for the number of cycles and iterations required to eliminate strong interferences,
(5) displaying the channels available to the calculating system to compute a schedule of frequencies across the service zone covering the defined zone of the schedule of frequencies,
(6) requesting checks on the neighboring areas,
(7) selecting parameters for the interference thresholds in the co-channel and in adjacent channel modes,
(8) initiating the computation of the schedule of frequencies,
(9) where necessary, refining the values of the interference thresholds regarding the co-channel and adjacent channel modes,
(10) during another time interval, reducing the other interferences (while however retaining the selected parameters to eliminate large interferences),
(11) recalculating the schedule of frequencies,
(12) checking the results,
(13) confirming the schedule of frequencies.

The present invention is described in the following description of a preferred implementation of the method of the invention and in relation to the attached drawings.

DETAILED DESCRIPTION OF THE DRAWING

Figure 1:
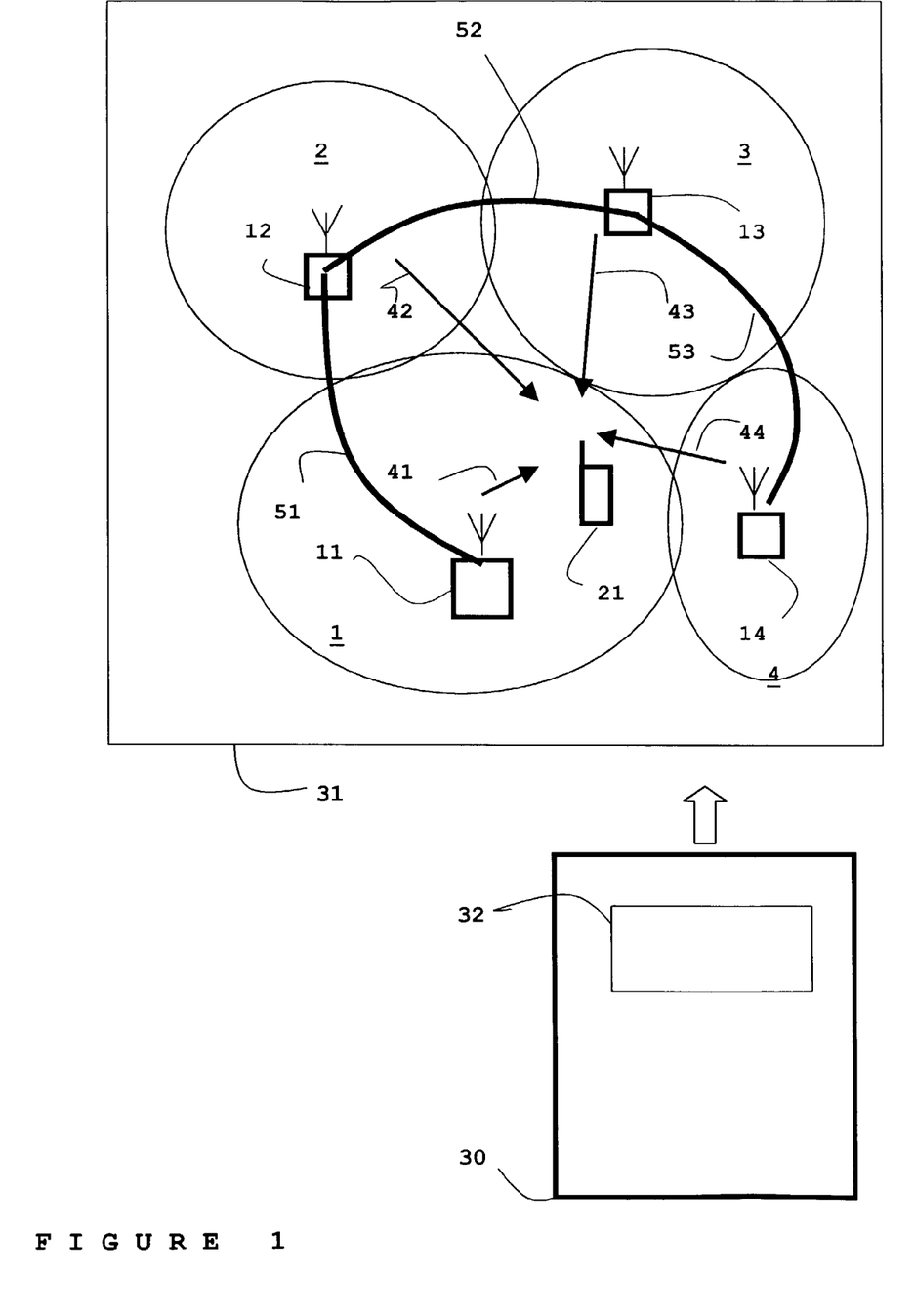
FIG. 1 is a schematic diagram of a portion of a wireless cellular telephone network being designed.

FIG. 1 includes a map 31 of a geographic zone of a cellular wireless telephone network being defined and stored in the fond of data in a calculating system and displayable on an interactive display system of a calculating system. This map 31 shows the anticipated positions of four radio cells respectively denoted 1, 2, 3 and 4 which enclose the respective base stations 11, 12, 13 and 14. The cells 1 through 4 are shown near each other and the boundary zones of cell 1 overlap those of the other three cells 2 through 4.

The map 31 represents the data of a digital map stored in the database of computer 30. The digital map 32 specifies the natural and artificial salients as well as their nature such as woods, buildings and others, whereby it is possible by calculation to estimate the radio attenuation of the links affected by the salients.

A range of frequencies is available to the network to be set up. An operator has previously defined, within the frequency range a plurality of carrier frequencies constituting transmission channels which in this example are digital, for instance those of a Global System for Mobile Communication (GSM) network. The frequencies are equally spread within the range at a given mutual spacing related to the frequency selectivity of the base stations 11 through 14 and of the anticipated wireless mobile telephone terminals as indicated by computer 21 shown in cell 1. During previous stages the operator previously defined the following:
* .CON containing the constraints matrix to be taken into account, obtained by calculation(s) of a CONSTRAINTS module,
* .LID which contains all the cells involved in frequencies scheduling as well as their characteristics, such as capacity, type of sharing,. etc.
* .PHB which contains a list of cells which the operator prohibits from being used in certain channels and the list of prohibited channels for each of these cells,
* .NBR which contains a list of neighboring cells and must correspond rigorously to the file *.LID,
* .MRP which contains a description of the shape of the frequency band.

In the manner illustrated by the arrows 41, 42, 43 and 44, the terminal 21 can receive transmissions from the four stations 11 through 14, the particular received signals being a real signal or interference signals. A radio link budget can be estimated based on the positions of the stations 11 through 14 relative to that of the mobile terminal 21 by calculating the transmission attenuation. In particular this attenuation depends on the distance between the particular transmitter and the receiving terminal 21 and can be easily calculated in the case of propagation in free space in air on the basis of an attenuation per unit distance of about 20 dB/km for the range of frequencies under consideration for the first 500 m, and of 30 dB/km beyond. If there are radio obstacles, the salient information provided by the database 32 allows the link budget to be estimated over a given propagation path.

The information of the map 31 therefore allows the computer 30 to compute at any site an estimated receiving strength of the signals emitted by the stations 11 through 14, provided their transmission signal strength was previously determined.

The positions of the stations 11 through 14 and their transmitted powers having been selected beforehand, the degree of geographic confinement that is admissible for a given carrier frequency is then determined: desirably a given carrier frequency is used a maximum number of times without however tile inter-cellular interferences degrading the radio service above a given threshold value.

In order to ascertain whether this threshold has been reached, for instance in cell 1, simulation is carried out—in practice using computer 30—to estimate the interference signal strength at a given frequency carrier so as to define thereby the constraints matrix.

When the receiving site has been selected substantially ii line of sight with the transmitting stations 12 through 14, the calculation of the propagation attenuation used to determine the received signal strength can be very easily carried out by assuming that the attenuation is that of free space and is given by the predetermined value of dB/km (20 or 30). Moreover the magnitudes of the signal strengths also can be secured by measurements on the terrain.

Two zones must be kept distinct when allocating the frequencies within a given cell:
the effective service zone,
the coverage zone.

When the planner of the schedule of frequencies allocates these frequencies, he/she also takes into account the effective cell service zone, which is that zone wherein the cell is the first, second and third server.

In the effective service zone, interferences are transmitted in both directions between the mobile terminal and the base station, that is
the uplink direction (signal from the mobile terminal to the base station),
in the downlink direction (signal transmitted from the base station to the mobile terminal).

The mobile terminal M1 receives from its base station S1 a useful signal having power C1. Other interfering signals from remote base stations S2 and S3 interfere with the proper operation of the mobile terminal M1 within the useful service zone.

Rules and standards have been established to avoid co-channel and adjacent-channel interference. They prescribe a minimum theoretical C/I threshold of 9 dB to use a given channel again.

A more "rigorous" threshold of 15 to 20 dB might be selected to be safe from the dangers inherent in the algorithm's prediction calculations.

An algorithm of computer 30 considers four rules when it allocates the frequencies:
1. Frequency allocation rule for the same cell,
2. Frequency allocation rule between two cells of one site,
3. Frequency allocation rule between two neighboring cells (on different sites).
4. Allocation rule regarding two adjacent channels.

This algorithm observes the frequency allocation rules on the same site (co-site allocation).

The prescribed minimum spacing between the center frequencies of the channels of two cells of the same site is 400 kHz. In view of the technical constraints on installed systems, a minimum spacing between the frequencies of the same cell (co-cell allocation) must be observed. The prescribed minimum spacing is 600 kHz between the center frequencies of one cell (each channel is 200 kHz wide). Adjacent channels cannot be used for cells depending on the same site.

Figure 4:
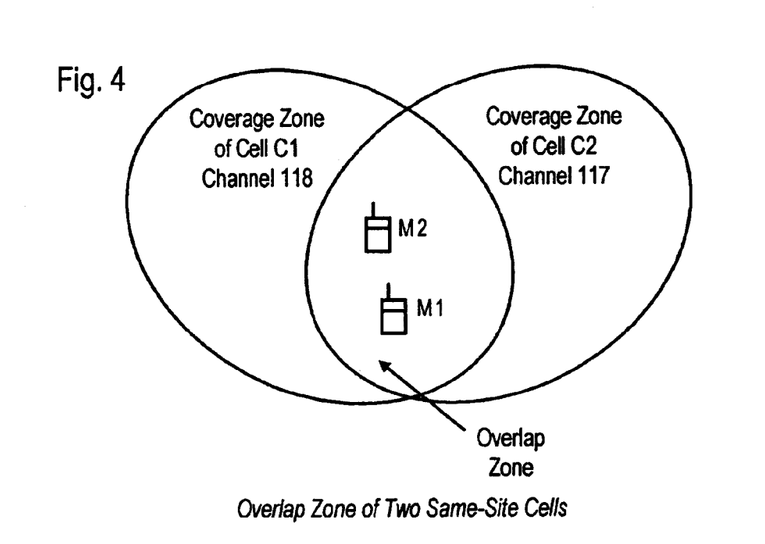
FIG. 4 is an illustration of the overlap zones of two cells located at different sites.

The schematic of FIG. 4 includes an illustration of two mobile terminals M1 and M2 situated in the overlap zone of the two cells C1 and C2 to which adjacent frequencies are allocated. This condition entails an increase in the adjacent C/I which is larger than the admissible maximum adjacent C/I. The algorithm, when performed, observes the frequency allocation rule between two neighboring cells (on different sites).

Two so-called neighboring cells include a service zone with a common boundary.

The prescribed minimum spacing between the center frequencies of the channels of the two neighboring cells on different sites is 400 kHz.

Figure 5:
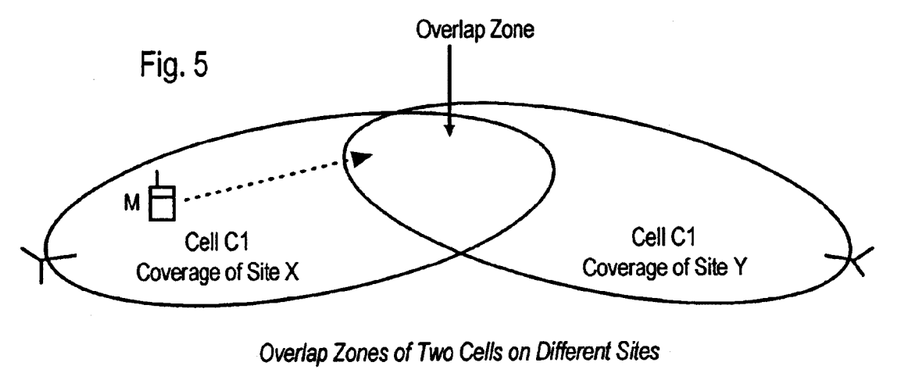
FIG. 5 is a schematic drawing of another overlap situation.

If, as shown in FIG. 5, a mobile terminal M is managed by the cell 1 of the site X when the mobile terminal enters the overlap zone between the cell C1 of the site X and the cell C3 of the site Y, and if no spacing were implemented between the respective frequencies of these cells, then the mobile terminal M would be subjected to large interferences. The above minimum spacing of 400 kHz is intended to minimize such interferences.

Two channels are said to be adjacent when they share a common boundary.

Tile use of these channels must not produce a C/I value less than −9 dB. In practice, the algorithm allows setting Lip a protection ratio of 0 to 10 dB depending on the density of the network being planned.

Figure 2:
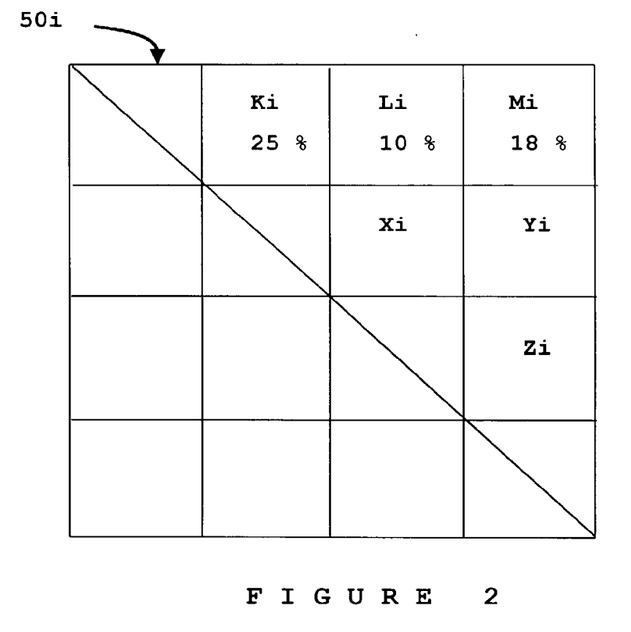
FIGS. 2 and 3 are respectively illustrations of two constraints matrices with the interference coefficients of the interfering cells in a column on the server cells and acting as a database to perform a perferred embodiment of the method of the invention.

FIG. 2 is an illustration of a matrix or square table $50i$ of interaction values or mutual interferences between all the cells 1 through 4 of tie network. Matrix $50i$ is called a constraints matrix, in particular for one of the values fi of the carrier frequencies. In this manner the matrix $50i$ allows submitting in computer-generated manner to a planning software or to a human operator the constraints which must be considered when selecting the frequency allocations for the stations 11 through 14. Thus the interference levels in cell 1 due to the cells 2, 3, 4 assume the respective values Ki, Li and Mi. Again, cell 2 is subjected to interferences due to the cells 3 and 4 respectively at levels Xi and Yi, wherein cells 3 and 4 interfere with each other at a level Zi. Matrices of the same type, such as the matrix $50j$ for the frequency fj of FIG. 3, can be set up for the various carrier frequencies, whereby it is possible to attain an overview of the radio constraints Kj, Lj, Mj, Xj, Yj, Zj. Each matrix $50i$ or $50j$ in fact is a block of data that the computer 30 can use, the representation presently under discussion being merely didactic.

Starting with the matrix $50i$, the interference levels Ki, Li, Mi and others interference levels from the other (omitted) cells call be classified according to their relative strengths in order to select the potentially largest sources of interference which in practice are the cells nearest the receiver 21.

Illustratively, assume that the interferences are as follows: Ki=25%; Li=10% and Mi=18%.

In this instance, station 12 is the largest source of interference (Ki=25%) in cell 1 followed in that order by the station 14 (Mi=18%) and then station 13 (Li=10%).

A high threshold for determining so-called large sources of interference, is illustratively set at HT=20%.

According to the method of the present invention, the following steps are performed to determine tile schedule of a given number of frequencies to be allocated to the plurality of base stations 11 through 14 for managing cellular wireless telephone network cells, where the network operates at a given number of radio communication carrier frequencies:
  the algorithm or the user selects a predetermined upstream cell, for instance cell 1,
  then the algorithm makes all estimate within the pertinent cell 1 of the interference levels at different frequencies due to other cells within radio range,
  and the algorithm allocates to the cell under consideration a frequency fi which is associated with minimal interference, and
  by selecting another cell from the remnant of the plurality of cells being processed, the method progressively develops a chain of downstream cells which are mutually within radio range by repeating for each the two preceding steps.

This particular algorithm is performed by computer 30 which uses a taboo list, meaning that in principle the list must not be modified. It is seen below that in the invention, the algorithm however modifies the taboo list to attain a better solution to frequencies scheduling.

Moreover, to entirely carry out the method of the invention:
  the system user predetermines a mutual interference threshold between two arbitrary cells, in this instance HT=20%
  the system compares the estimated interference levels with the threshold HT
  the calculating system defines a remainder of cells by eliminating from the remaining plurality of cells to be processed those cells in the taboo list and associated to an interference level less than the threshold HT, and
  after the remaining cell is defined by developing in this manner a first segment 51 of a cell chain of allocated cells, the algorithm then develops a second chain segment 52, 53 by allocating frequencies to the unprocessed remaining cells other frequencies to be allocated to these cells the remaining cells by iterating the interference threshold and selecting and comparaison steps until the remainder is empty.

Therefore only the strongest perturbations are taken into account to select a frequency to allocate to the cell being checked out, in this instance cell 1. In this example, only the station 12 (Ki=25%, Kj=23%) is being considered for the two frequencies involved in this case. The selection therefore might apply to the frequency fi, or preferably to a third, less interfered-with frequency, from among a plurality possible frequencies.

Figure 3:
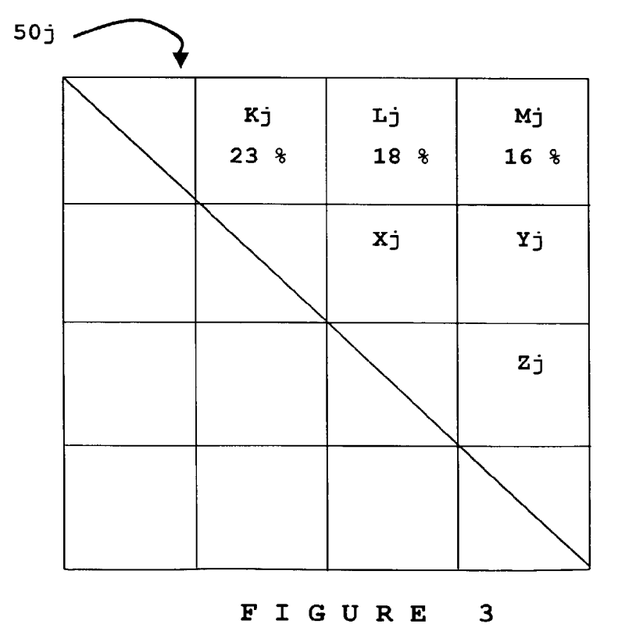

If the cell 1 constitutes one of the first links of the first chain segment, a large number of the coefficients of the tables $50i$ and $50j$ will in fact be unknown; therefore these coefficients will be at the indicated value Ki of the corresponding frequency fi that is selected for the cell 2 through 4 which at this time is considered to be interfering, otherwise the coefficient Ki is zero.

Having checked out in this manner a reduced number of cells, namely the sources of high interference at the various frequencies, a frequency fj, or another frequency, is thus allocated to the cell 1. If now a cell which is within the radio range of cell 1 is checked out, for instance the cell 2 that determines the segment 51—which in this instance is reduced to a link for clarity in the drawing—then its matrices such as 50*i* and 50*j* at least contain information about the cell 1, that is that Ki is zero in this case and Kj=23%.

The computer 30 repeats the above stages by using matrices 50*i* corresponding to the frequency fi, with 50*j* corresponding to the frequency fj, until the highly interfering cells have been processed. In this manner computer 30 determines a first chain segment 51.

Next the second segment is set up by checking the stations 13, 14 or the remaining cells 3, 4 which are weakly interfering. The link 52 in this manner connects the stations 12 and 13 and the downstream link connects the stations 13 and 14

Be it borne in mind that the selection of a new station to be checked out might relate to a station which is not adjacent to the previous one in the chain. A logic chain of cells 1 through 5 is involved, each link constituting a causal connection represented by the frequency of the upstream cell which affects the frequency selection of its downstream cell.

Preferably and as in this case, computer 30 develops the first segment using a series of truncated cycles which, as regards each cell 1 through 5 to be processed, take into account only a limited number of interfering cells that remain to be processed and do exceed the threshold HT. The segment 52, 53 is developed by a series of comprehensive checkouts taking into account, for each cell to be processed, substantially all of the interfering cells that remain to be processed.

In this manner, computer 30 performs a first and coarse processing of the frequency constraints. Subprocessing requires only a restricted computational load, and the optimization of frequencies scheduling is carried out when the sources of low interference are examined.

Figure 6:
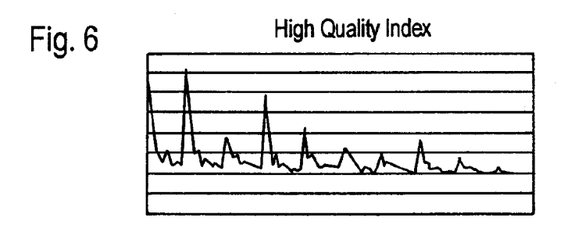
FIG. 6 is an illustrating including the results flowing from modifying taboo lists.
Figure 7:
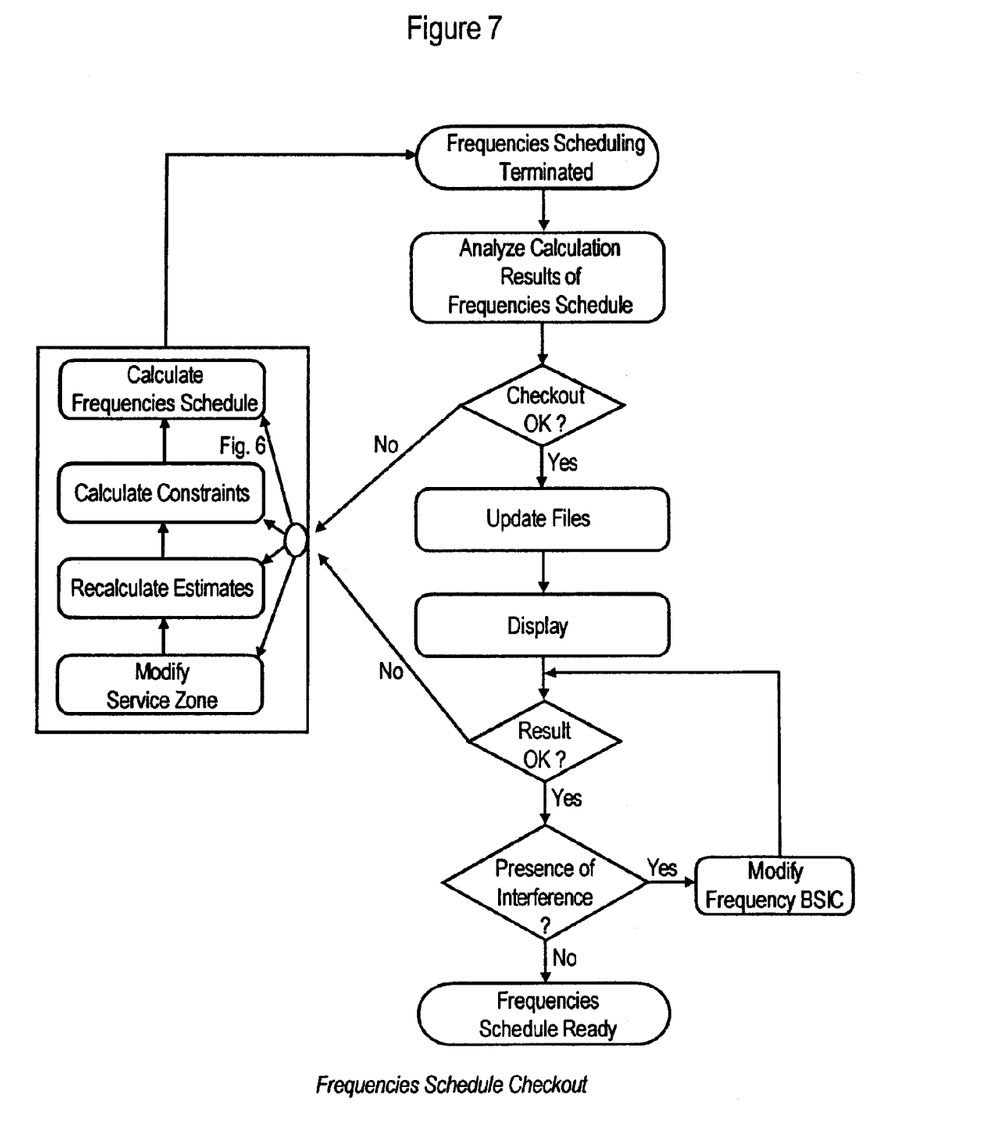
FIG. 7 is a flow diagram of the confirmation procedure of the frequencies scheduling of the invention.

In order to ad just, if called for, a less than optimal selection of frequency allocations to certain sources of high interference, the user or the program extracts some of the cells from the first segment by modifying the taboo list to determine if their integration into the second segment 52, 53 would result in a reduced-interference cell chain. As shown in FIG. 6, the first peak corresponds to the first processing based on the taboo list and the second peak corresponds to the second processing which includes extracting certain cells from the taboo list to ascertain if the change in frequency allocations provides for more rapid system convergence, making it possible to allocate frequencies generating minimal interference across the network to all the cells. If this is not the case, the system carries out other iterations represented by the other peaks of FIG. 6, by eliminating other cells from the taboo list, until a mole satisfactory schedule of frequencies has been achieved.

This feature enables stoppages to be averted during operations, for instance when the examined cell is enclosed peripherally by many strong sources of interference. In this case a "breach" is set up by suppressing the interfering frequency of one of the above peripheral cells to allocate it to the central cell being checked, which then can be processed and be entered into the chain or list. Ultimately the interfering peripheral cell is processed and be assigned another frequency because the central cell—which assumed the frequency in conflict—has now become a source of interference as regards the initially peripheral cell.

The calculation of a schedule of frequencies is carried out by means of the functions of the "Frequencies" menu of the algorithm. These functions make use of different kinds of files at the input and the output.

The files taken into account at the input to calculate a schedule of frequencies are:
 *.CON which contains the constraints matrix to be taken into account as a result of the calculating model CONSTRAINTS,
 *.LID which contains the set of cells involved in scheduling the frequencies as well as their characteristics, e.g., capacity, kind of sharing, etc.
 *.PHB which contains a list of cells which are prohibited by the planner from using for certain co-channels and a list of prohibited channels for each of the cells in the list,
 *.NBR which contains a list of neighboring cells and must correspond rigorously to the file *.LID,
 *.MRP which contains a description of the bandwidth.

A schedule of frequencies can be developed by using the method of the invention.

Scheduling the frequencies in accordance with the invention involves attempting to find a two-step solution for minimizing the sum of the interferences:
 a first step solving the problem of large interferences,
 a second step solving the problem of other interferences.

These two steps can be performed in the manner shown by the plot of FIG. 6.

In the first step, and as long as the calculating system is able to eliminate strong interferences, the values of the high co-channel threshold value are lowered (not to be confused with the co—channel and fixed adjacent channel safety threshold values set at 9 and −4 dB, in a stored file FREQUENCY TXT).

The selection of these values of co-channel and adjacent-channel threshold values (having parameters selected on the basis of the data-system interface) is carried out in several steps:
 The first step allocates relatively high percentage values to allow the tool to solve the problem
 The second step involves lowering these threshold values.

Based on the new quality index (zero of different from zero) determined in the first step other decreases (if said index is zero) or an increase (if the index exceeds zero) must be carried out:

Another index must be found which is as close as possible to zero. Knowing the quality indices of the previous schedule of frequencies, it is possible to isolate the thresholds that are used (in order to solve the problem of the large interferences and of the neighborhoods).

The lower the quality index, the schedule of frequencies (in a given geographic zone at a given network) becomes better.

In the second step, compuetr 30 solves the problem caused by the other interferences. Once the large interferences have been eliminated, computer 30 must solve the problem of the other interferences (lower than the high interference thresholds).

The result is a schedule of frequencies associated with a quality index.

The user defines a number of cycles and a number of iterations on an active interface of the data system.

A number of iterations is applied during each cycle, including a different initial condition (different list of taboo frequencies).

In each iteration, the calculating system algorithm modifies a frequency for a particular cell and then calculates a quality index corresponding to the frequency for all possible frequencies and for the full set of cells of the planned zone. At the end of the iteration, the combination offering the best quality index is selected.

In summary, to calculate the frequencies schedule in a service zone on the basis of different files (constraints, neutral zones, neighborhood and interference log) that are created and stored, the user or computer 30 carries out the following operations at the interface:

1. Selecting a menu for selecting parameters, then calculating the schedule of frequencies,
2. Selecting the dialog box parameters in such a way that the frequency having the least interference has allocation priority for the BCCH channel,
3. Taking into account the pre-allocated channels when the service zone was created,
4. Selecting parameters for the number of cycles and iterations required to eliminate large interferences,
5. Displaying the channels which are available to computer 30 to calculate the schedule of frequencies across the service zone covering the defined zone of the schedule of frequencies,
6. Requesting checking out the neighborhoods,
7. Selecting parameters for the co-channel and adjacent-channel interference thresholds
8. initiating the schedule of frequencies calculation
9. Refining if necessary the co-channel and adjacent-channel interference threshold values
10. Subsequently reducing the other interferences while preserving the selected parameters to eliminate the strong interferences,
11. Recalculating the schedule of frequencies,
12. Checking the result,
13. Entering the schedule of frequencies.

The enabling action of a schedule of frequencies schedule is an established procedure allowing certain steps to be re-started stages anew to improve the end result and to attain satisfactory scheduling.

During such a step analysis of the log is carried out from two viewpoints:
from the tool viewpoint of computer 30, and
from the trade viewpoint.

As regards the viewpoint of computer 30 (analyzing the .LOG file):

A check must be carried out that while the algorithm is running, to determine if computer 30 indeed did take into account all the input files (neighboring cells, interference logs, features of cells which are part of the service zone . . . ).

Moreover the lines impacted by error or alarm messages must be analyzed.

As regards the trade viewpoint (analyzing the schedules log, starting at the .INT file):

In the first place, the user considers the interferences that were left unsolved by computer 30.

The objective in this case is that the number and the intensities of the residual interferences be low.

Next the analysis relates to detecting the presence or absence of neighborhood infringements. The priority is to process neighborhood infringements in the co-channel mode on the BCCH channel in order to avoid the danger of not differentiating the cells.

The file .INT summarizes the set of unresolved interferences at the end of the schedule calculation and also the distribution of different channels across the set of the involved cells.

Illustration of an .INT File
Number of mutual interferences coc>(15%, 25%) or adj>(10%, 20%) 0

BCCH QUALITY OF THE PROPOSED 2524.50 Scheduling
Number of mutual interferences BCCH coc>(15%, 25%) or adj>(10%, 20%) 1BCCH QUALITY OF THE MICRO-CELLS 125.40
Number of mutual micro interferences coc>(15%, 25%) or adj>(10%, 20%) 0
BCCH QUALITY OF MICROCELLS 42.70
Number of mutual micro interferences BCCH coc>(15%, 25%) or adj>(10%, 20%) 0
Distribution of Residual Co-channel Mutual Interferences
Number of mutual interferences exceeding 30%: 0
Number of mutual interferences between 30 and 25%: 0
Number of mutual interferences between 25 and 20%: 0
Number of mutual interferences between 20 and 15%: 0
Number of mutual interferences between 15 and 10%: 45
Number of mutual interferences between 10 and 5%: 188
Number of mutual interferences between 5 and 1% 3,750
Distribution of Residual Co-channel bcch Mutual Interferences
Number of mutual interferences exceeding 30%: 0
Number of mutual interferences between 30 and 25%% 0
Number of mutual interferences between 25 and 20%: 0
Number of mutual interferences between 20 and 125%: 0
Number of mutual interferences between 15 and 10%: 11
Number of mutual interferences between 10 and 5%: 54
Number of mutual interferences between 5 and 1%: 1,751.
Distribution of the Residual, Adjacent and Mutual Interferences
Number of mutual interferences exceeding 30%: 0
Number of mutual interferences between 30 and 25%: 0
Number of mutual interferences between 25 and 20%: 0
Number of mutual interferences between 20 and 15%: 0
Number of mutual interferences between 15 and 10%: 1
Number of mutual interferences between 10 and 5%: 227
Number of mutual interferences between 5 and 1%: 8,945
Distribution of the Residual, Adjacent bcch Mutual Interferences
Number of mutual interferences exceeding 30%: 0
Number of mutual interferences between 30 and 25%: 0
Number of mutual interferences between 25 and 20%: 0
Number of mutual interferences between 20 and 15%: 0
Number of mutual interferences between 15 and 10%: 1
Number of mutual interferences between 10 and 5%: 73
Number of mutual interferences between 5 and 1%: 4,185.

A frequency histogram (listed at the end of this file) indicates the allocation rate of each channel for each cell.

At the end of these analyses, two cases are possible:
the report is unsatisfactory,
the report is satisfactory.

The Report is Unsatisfactory:
If the results are unsatisfactory, modifications must be introduced:
(0) if called for, modify the service zone
(1) recalculate the estimates made
(2) modify and recalculate the constraints
(3) pre-allocate the channels
(4) recalculate the frequencies schedules.

It is clear to one of ordinary skill in the art that the above invention can be carried out in many other specific ways without thereby transcending the claimed field of application of this invention. Consequently the modes of implementation discussed herein must be considered illustrative and can be modified within the scope of the attached claims.

The invention claimed is:

1. A method of scheduling a given number of frequencies to be allocated to a plurality of base stations for managing cells of a cellular wireless telephone network comprising the steps of:
   (a) selecting a predetermined upstream first cell,
   (b) for said first cell estimating interference signal strengths at the various frequencies from other cells within radio range,
   (c) allocating to said first cell a frequency (fk) having a minimal interference, and
   (d) selecting a second cell from the other cells to be processed,
   (e) progressively developing a chain of downstream cells mutually within radio range by repeating steps (b) and (c) for each of the downstream cells,
   (f) setting a mutual interference threshold between two arbitrary cells,
   (g) comparing the estimated interference levels with a threshold
   (h) defining a remaining cell by eliminating from said remainder of the plurality of cells to be processed the cells associated with an interference level less than the threshold, and
   (i) developing a first chain segment of cells having allotted frequencies in response to said remaining cells having been defined, developing a second chain segment by allocating frequencies to the unprocessed cells of the remainder by searching, for purposes of allocation, other frequencies to be allocated to these cells of the remainder by iterating steps (f) and (h) until the remainder is empty, and
   (j) developing the first segment from a series of truncated cycles which take into account with respect to each cell to be processed only a limited number of interfering cells that remain to be processed and that exceed the threshold, developing the second segment by a series of comprehensive testing cycles which take into account with respect to each cell to be processed the totality of the interfering cells that remain to be processed.

2. Method as claimed in claim 1 further comprising retrieving some cells from the first segment in order to check whether integrating them into the second segment would result in a chain of cells having greater interference relative to not integrating them into the second segment to improve the frequency allocation schedule.

3. Method as claimed in claim 1 wherein the algorithm takes into account the following files:
   *.CON including the constraints matrix resulting from a calculation of a CONSTRAINTS module and which must be considered,
   *.LID including a set of cells involved in scheduling the frequencies schedule and characteristics thereof
   *.PHB including a list of cells prohibited by the planner from using certain channels and a list of prohibited channels with respect to each of these cells,
   *.NBR including a list of the neighboring cells and strictly corresponds to the file *.LID,
   *.MRP including a list of the shape of the frequency bandwidth.

4. Method as claimed in claim 1 wherein in the event of an unsatisfactory result, the method includes:
   adjusting the service zone of the user by resort to interactive graphic devices of a calculating system,
   recalculating the interference estimates for each frequency of each cell,
   adjusting and recalculating the constraints matrix,
   pre-allocating channels, and
   recalculating the schedule of frequencies.

5. Method as claimed in claim 1 further including:
   selecting a menu making it possible to select parameters and then to calculate the schedule of frequencies,
   selecting parameters of a dialog box in a maimer that the least interfered-with frequency has priority of allocation to a BCCH channel,
   taking into account the pre-allocated channels when creating the service zone,
   selecting parameters for the number of cycles and iterations required to eliminate the large interferences,
   displaying the channels available for the schedule of frequencies across the service zone covering the defined zone of the schedule of frequencies
   requesting verification of the neighborhoods
   selecting parameters for co-channel and adjacent-channel interferences thresholds,
   initiating the calculations for the schedule of frequencies,
   if necessary refining the values of the co-channel and adjacent-channel interference thresholds,
   reducing, during a second phase of operation, the other interferences while preserving parameters that eliminate the strong interferences,
   restarting the calculation of the schedule of frequencies,
   checking the results, and
   confirming the schedule of frequencies.

6. Apparatus for determining a planned schedule of a given number of frequencies to allocate to a plurality of base stations for managing cells of a cellular wireless telephone network comprising a calculating system for:
   accessing to a stored list including a given number of radio communication carrier frequencies (fi, fj),
   selecting a predetermined upstream cell within a geographic zone defined on a map stored in the calculating system,
   estimating interference levels at the various frequencies arising from other cells within its radio range by calculating interferences in the cell under consideration,
   allocating to the cell under consideration a frequency (ik) associated with a minimal interference and storing said frequency in a file of the resolved cells,
   progressively developing a chain of downstream cells which are mutually within radio range by selecting another cell of the remainder of the plurality of cells to be processed and repeating for each the two preceding stages,
   enabling a user to predetermine a mutual interference threshold (HT) between two arbitrary cells,
   comparing the estimated interference levels with the threshold (HT),
   defining a remaining cell by eliminating from the remainder of the plurality of cells to be processed the cells associated with an interference level which is less than said threshold,
   responding to said remaining cell having developed a first chain segment of cells having allocated frequencies, by developing a second chain segment by allocating frequencies to the unprocessed cells of the remainder by searching, for purposes of allocation, other frequencies to allocate to the remaining cells by iterating until said remainder is empty,
   developing said first segment by using a series of truncated cycles which only take into account for each cell to be processed a muted number of the interfering cells that remain to be processed and exceeding the threshold (HT) and developing the second segment by using a series of comprehensive test cycles taking into account, for each cell to be processed, all of the interfering cells that remain to be processed.

7. Apparatus as claimed in claim 6, wherein the computer system is arranged for enabling the user or the algorithm to retrieve from the first segment a taboo list including some of the cells to check whether their integration into the second segment would result in a chain of cells having less interference.

8. Apparatus as claimed in claim 6 wherein the computer system is arranged to store and to take into account the following files:
   *.CON which contains a constraints matrix which results from calculation of the CONSTRAINTS module
   *.LID which contains a set of cells for planning the schedule of frequencies as well as the characteristics thereof,
   *.PHB which contains a list of cells which the user bars from using certain channels and a list of prohibited channels for each of these cells,
   *.NBR which contains a list of neighboring cells and corresponding to the *.LID file,
   *.MRP which contains the shape of a frequency band.

9. Apparatus as claimed in claim 6 wherein the computer system is arranged for:
   enabling the user to adjust the service zone by using interactive graphic devices
   recalculating the interference estimates for each frequency of each cell
   enabling a user to adjust recalculation of the constraints matrix, and
   pre-allocating the channels of the system's interactive devices by recalculating the schedule of frequencies.

10. Apparatus as claimed in claim 6, wherein the computer system is arranged for:
    selecting a menu for selecting parameters and calculating the schedule of frequencies
    selecting parameters of a dialog box so the frequency which is the least interfered with is allocated with priority to a BCCH channel
    taking into account the pre-allocated channels when creating a service zone
    selecting parameters for the number of cycles and iterations for eliminating the greatest interferences
    displaying the channels available when calculating the schedule of frequencies on the service zone covering the defined zone of the frequencies schedule,
    requesting verification of the neighborhoods
    selecting parameters of the co-channel and adjacent-channel interference thresholds
    initiating the calculation of the schedule of frequencies
    if necessary refining the values of the co-channel and adjacent-channel interference thresholds
    in a second operating phase, reducing the other interferences while preserving the selected parameters to eliminate the greatest interferences
    again calculating the schedule of frequencies
    checking the results and
    entering the schedule of frequencies.

11. Apparatus for determining a planned schedule of a given number of frequencies to allocate to a plurality of base stations for managing cells of a cellular wireless telephone network comprising:
    means for accessing to a stored list including a given number of radio communication carrier frequencies ($f_i$, $f_j$),
    means for selecting a predetermined upstream cell within a geographic zone defined on a map stored in the calculating system,
    means for estimating interference levels at the various frequencies arising from other cells within its radio range by calculating interferences in the cell under consideration,
    means for allocating to the cell under consideration a frequency ($f_k$) associated with a minimal interference and storing said frequency in a file of the resolved cells,
    means for progressively developing a chain of downstream cells which are mutually within radio range by selecting another cell of the remainder of the plurality of cells to be processed and repeating for each the two preceding stages,
    means for enabling a user to predetermine a mutual interference threshold (HT) between two arbitrary cells,
    means for comparing the estimated interference levels with the threshold (HT),
    means for defining a remaining cell by eliminating from the remainder of the plurality of cells to be processed the cells associated with an interference level which is less than said threshold,
    means for responding to said remaining cell having developed a first chain segment of cells having allocated frequencies, by developing a second chain segment by allocating frequencies to the unprocessed cells of the remainder by searching, for purposes of allocation, other frequencies to allocate to the remaining cells by iterating until said remainder is empty,
    means for developing said first segment by using a series of truncated cycles which only take into account for each cell to be processed a limited number of the interfering cells that remain to be processed and exceeding the threshold (HT) and developing the second segment by using a series of comprehensive test cycles taking into account, for each cell to be processed, all of the interfering cells that remain to be processed.

12. Apparatus as claimed in claim 11, further including the computer means for enabling the user or the algorithm to retrieve from the first segment a taboo list including some of the cells to check whether their integration into the second segment would result in a chain of cells having less interference.

13. Apparatus as claimed in claim 11, further including means for storing into account the following files:
    *.CON which contains a constraints matrix which results from calculation of the CONSTRAINTS module
    *.LID which contains a set of cells for planning the schedule of frequencies as well as the characteristics thereof,
    *.PHB which contains a list of cells which the user bars from using certain channels and a list of prohibited channels for each of these cells,
    *.NBR which contains a list of neighboring cells and corresponding to the *.LID file,
    *.MRP which contains the shape of a frequency band.

14. Apparatus as claimed in claim 11, further including:
    means for enabling the user to adjust the service zone by using interactive graphic devices;
    means for recalculating the interference estimates for each frequency of each cell;
    means for enabling a user to adjust recalculation of the constraints matrix; and means for pre-allocating the channels of the system's interactive devices by recalculating the schedule of frequencies.

15. Apparatus as claimed in claim 11, further including:

means for selecting a menu for selecting parameters and calculating the schedule of frequencies;

means for selecting parameters of a dialog box so the frequency which is the least interfered with is allocated with priority to a BCCH channel;

means for taking into account the pre-allocated channels when creating a service zone;

means for selecting parameters for the number of cycles and iterations for eliminating the greatest interferences;

means for displaying the channels available when calculating the schedule of frequencies on the service zone covering the defined zone of the frequencies schedule;

means for requesting verification of the neighborhoods;

means for selecting parameters of the co-channel and adjacent-channel interference thresholds;

means for initiating the calculation of the schedule of frequencies;

means for refining the values of the co-channel and adjacent-channel interference thresholds if refining the values is necessary;

means for a second operating phase, reducing the other interferences while preserving the selected parameters to eliminate the greatest interferences;

means for again calculating the schedule of frequencies;

means for checking the results; and means for entering the schedule of frequencies.

16. Apparatus for performing the method of claim 1.

* * * * *